Sept. 29, 1953 V. A. P. SARACCHI 2,653,690
MOTOR TRANSMISSION
Filed Feb. 19, 1951 2 Sheets-Sheet 1
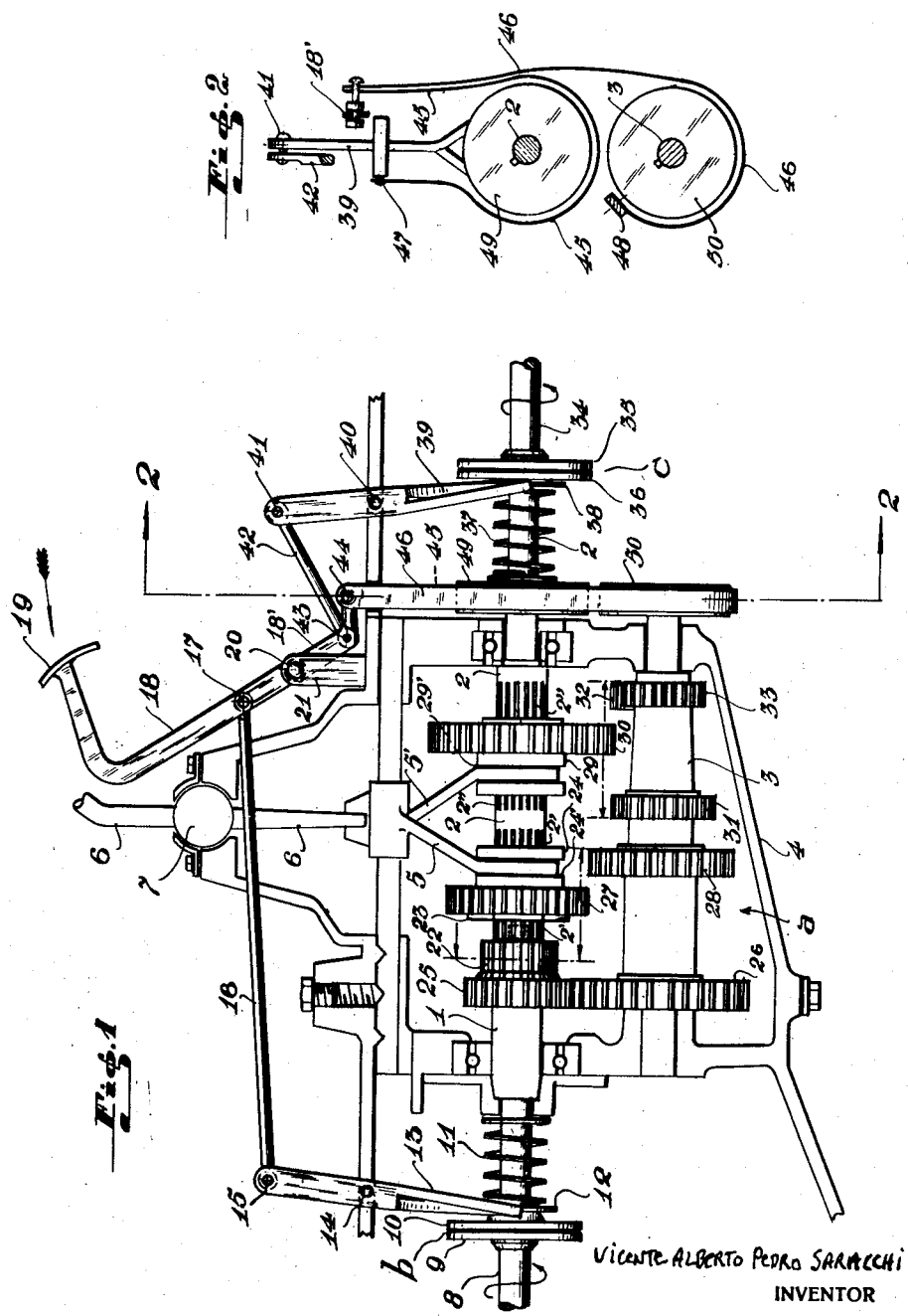
VICENTE ALBERTO PEDRO SARACCHI
INVENTOR
BY  Moth + Blum
ATTORNEYS

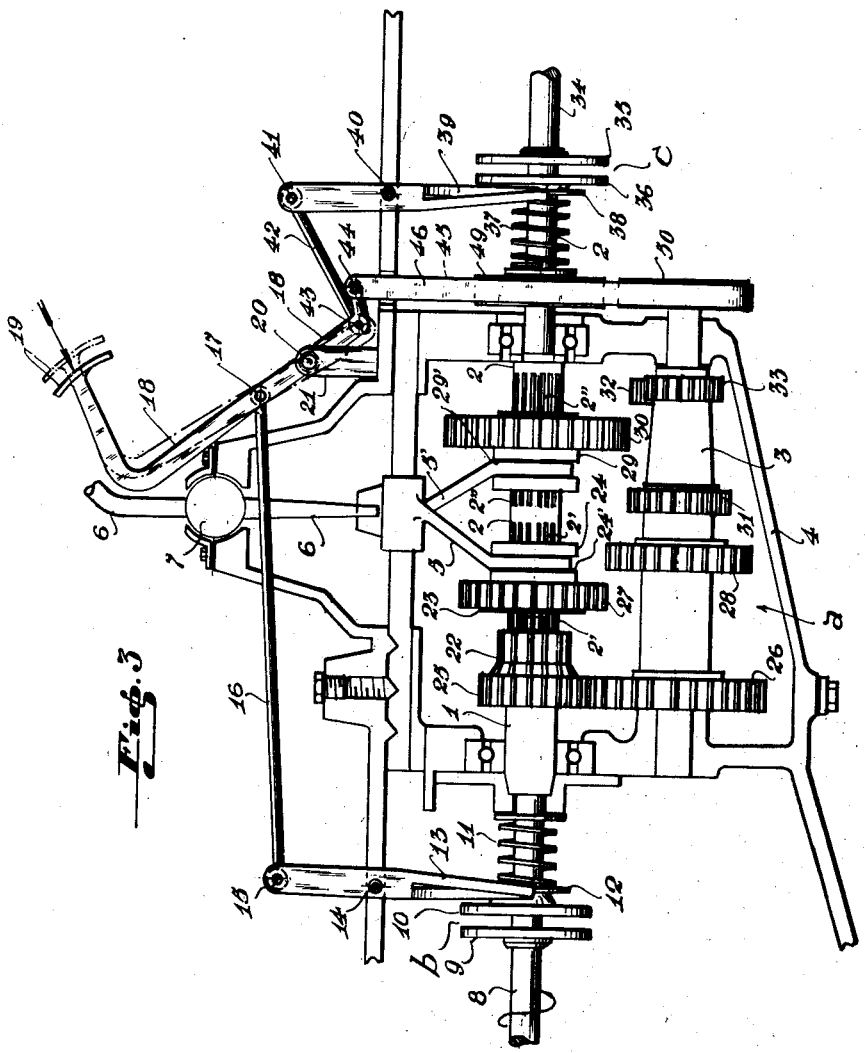

Patented Sept. 29, 1953

2,653,690

UNITED STATES PATENT OFFICE 2,653,690

MOTOR TRANSMISSION

Vicente Alberto Pedro Saracchi, Buenos Aires, Argentina

Application February 19, 1951, Serial No. 211,669

4 Claims. (Cl. 192—4)

This invention relates to improvements in motor transmissions, and more particularly to a gear box having means for rendering the output connection independent from the combinaton of gear wheels corresponding to the shift.

Ordinary gear boxes, particularly those in automobiles, are inserted in the transmission with the coupling of an intermediate clutch the object of which is to isolate the connection with respect to the motor at the time of the shift; this is necessary, as otherwise it would not be possible to release and mesh the toothed wheels in the mechanical combination.

This isolation, however, is insufficient for achieving the purpose of the shift, since the Cardan with the wheels will continue to function by inertia and will keep the rotary motion of the entire gear system; this means that the movement of the connection itself does not allow the speed change to be carried out as easily as it could be done if the mechanism were held at rest.

This problem which is found in all transmissions using mechanical changes, has been solved by means of the improvements of this invention, since without complicating the general operation of the machine, it allows the conditioning of the elements of the shift system so that they may be released and meshed without any special effort and without damaging the gear teeth due to friction.

To this end, apart from the corresponding clutch between the motor shaft and the input of the gear box, there is provided a second clutch connected mechanically to the primary clutch control pedal or lever, whereby both the coupling and the uncoupling are made simultaneously. Thus, in all shift circumstances a complete isolation of the box gears is obtained, not only as regards the motor but also the working connection; in order to make the operation safer, the same means controlling both clutches have a complementary branch acting on a brake for the gear system shafts, whereby the gears will stop at the time of unmeshing, so that the change will be made smoothly both in the meshing and the release thereof.

In order that the invention may be more clearly understood and readily carried out, a preferred embodiment of the improved gear box has been illustrated by way of example in the accompanying drawings, in which:

Fig. 1 is a schematic sectional view of a gear box of the usual type, wherein isolating clutches for the shifts have been applied at the input and output of said box, in combination with the brakes for the gear wheel shafts. In this view, the clutches are shown in engaged position.

Fig. 2 is a sectional view taken along the lines 2—2 in Fig. 1 and showing the respective gear box shaft brakes; and Fig. 3 is a view similar to Fig. 1 but showing the clutches in released position ready for shifting.

The same reference characters are used to indicate like or corresponding parts or elements throughout the drawings.

As shown in the drawings, a indicates the shift system or mechanism which as is usual comprises a main shaft 1, a secondary shaft 2 and an intermediate shaft 3, all inclosed in a box 4, into which extend the forked portions 5 and 5' of a shift lever 6 bearing on a fulcrum 7.

The main shaft 1, constituting the motion input, is connected to the drive shaft 8 by means of a clutch b formed by plates 9 and 10 of which the latter is displaceable and urged by a spring 11 towards the connecting position with respect to plate 9. Said plate 10 carried a ring 12 associated with a fork member 13 bearing on a pin 14 in the form of a lever.

By means of a pivot 15, said fork member 13 is connected with a rod 16 which in turn is connected through a pivot 17 to a lever 18 corresponding to the control pedal 19; said lever 18 bears on a fulcrum 20 in a bearing block 21.

The main or input shaft 1 carries a socket 22 with which a counter-socket 23 on a slidable bushing 24 is connected, said slidable bushing 24 being locked to the secondary shaft 2 by means of grooves 2' on said shaft. Upon the counter-socket 23 engaging the socket 22 a direct connection between shafts 1 and 2 is obtained.

The main shaft 1 carried a gear wheel 25 permanently meshing with a gear wheel 26 on the intermediate shaft 3.

The slidable bushing 24 carried a gear wheel 27 capable of meshing with a gear wheel 28; this connection establishes the intermediate speed. Said slidable bushing 24 is provided with a throat 24' adapted to receive the fork member 5 of shift lever 6.

In another portion of shaft 2 there is provided a further slidable bushing 29 which is locked so as to rotate together with said shaft 2, for which purpose the latter is provided with a grooved portion 2''. This slidable bushing 29 is formed with a throat 29' adapted to receive the other fork member 5' of shift lever 6. Said bushing 29 also carries a gear wheel having a large number of teeth 30 and located so that in a given position of bushing 29 it may mesh with a gear wheel 31 determining the minimum speed, while in another position of bushing 29 said gear wheel 30 will mesh with a gear wheel 32 corresponding to a further shaft parallel to the intermediate shaft 3, and since this gear wheel 32 is connected with the gear wheel 33 on said intermediate shaft 3, it will have a reverse effect.

The above mechanism is described and shown by way of example and it may comprise any combination known in the art.

The gear box described above is inserted between the drive shaft 8 corresponding to a motor and the shaft or Cardan 34 which may terminate in the wheel differential in the case of an automobile, but the gear box may be inserted in any other transmission between a motor and a member to be moved.

Since it is advisable to stop the gear wheels in order to carry out the shifts, apart from said clutch $b$ the transmission is provided with a further clutch $c$ which, due to its arrangement, constitutes the basis of the improvements of this invention.

In effect, said clutch $c$ is arranged as a coupling means between the secondary shaft 2 and the connecting shaft 34; this means that clutch $c$ is also a secondary clutch.

The clutch $c$ comprises a plate 35 secured to shaft 34 and a plate 36 mounted on shaft 2 but in a slidable manner, so as to be capable of shifting for coupling or uncoupling the shaft 2 with respect to shaft 34.

The plate 36 is urged by a spring 37 the tension of which will cause the connection of both plates (Fig. 1). Said plate 36 carries a ring 38 connected with the fork member 39 which acting as a lever bears on pin 40 and through a pivot 41 is connected to a rod 42 acting as a connecting rod and coupled through a pivot 43 to an extension 18' of lever 19. Thus, on pressing the pedal as shown in Fig. 3, both clutches $b$ and $c$ will be released at the same time so that the box gears will simultaneously become isolated both from the drive shaft 8 and the connecting shaft 34.

Apart from the dual control of clutches $b$ and $c$, the extension 18' of lever 18 carries a pin 44 securing the bands 45 and 46 starting at the fixed points 47 and 48 respectively, after surrounding the brake discs 49 and 50 keyed to shafts 2 and 3, respectively.

Operation

Assuming that the gear box is inserted in the transmission of a motor corresponding to an automobile, the mechanism $a$ thereof will respond according to the relative positions of the gear wheels.

With the pedal 19 in released position (Fig. 1) the springs 11 and 37 will press the plates 10 and 36 against the respective plates 9 and 35, so that if the mechanism is turned to speed, the action of the motor will be transmitted to shaft 34 from shaft 8.

The position shown in Figs. 1 and 3 corresponds to dead center.

In order to start the vehicle, with the motor running pedal 19 should be pressed as shown in Fig. 3, whereby the mechanism $a$ will be isolated both from the drive shaft 8 and the connecting shaft 34, while at the same time the gear wheels will stop since the same double unclutching action will brake the shafts 2 and 3 upon the bands 45 and 46 being tightened against the discs 49 and 50.

With the mechanism $a$ stopped, the corresponding shift may be readily effected.

First, by actuating the fork member 5' by means of lever 6, the gear wheel 30 should be moved towards pinion 31 so as to obtain the first speed, after which the pedal 19 should again be released so as to obtain the connection between shafts 8 and 34 through the main shaft 1, intermediate shaft 3 and secondary shaft 2.

Pedal 19 is then pressed again so as to isolate and stop the gear wheels in mechanism $a$ in order to establish a second shift, viz: by connecting gear 27 with gear 28, which will give the intermediate speed. After releasing the pedal 19, the connection between shafts 8 and 34 is obtained through mechanism $a$.

Finally, once the unclutching and braking has been effected by means of pedal 19, lever 6 is moved in the corresponding direction so that through the fork member 5 the bushing 24 may be slid until the counter-socket 23 is coupled to the socket 22, thereby causing a direct connection between the main shaft 1 and the secondary shaft 2, bringing about the maximum speed when the pedal 19 is released.

It is evident that in carrying out the invention, many modifications, changes and/or alterations will occur to those skilled in the art, without departing from the scope of the invention as clearly set forth in the appended claims.

I claim:

1. In a gear box for motor transmission, the combination with an input drive shaft including a terminal clutch member, and an output drive shaft also including a terminal clutch member, said shafts being spaced apart intermediate the respective clutch members with the shafts and clutch members axially alined, of a shiftable gear mechanism assembly operatively positioned intermediate said clutch members for providing variable relations between the drive and driven shafts at will, said mechanism including a gear carrying main shaft having a terminal clutch member complemental to the drive shaft clutch member, a gear carrying secondary shaft also having a terminal clutch member complemental to the driven shaft coupling member, said main and secondary shafts being axially alined with each other and with the drive and driven shafts and mounted for rotation at different or similar speeds at will, said terminal clutch members on the main and secondary shafts being axially movable for engagement with the terminal clutch members of the drive and driven shafts, the gears of the secondary shaft being movable axially on such shaft and rotatable in unison therewith, a gear carrying intermediate shaft spaced in parallelism with said main and secondary shafts, and a shift lever operatively connected with the secondary shaft movable gears, said mechanism assembly being mounted for selective engagement of predetermined gears by shift lever activity to drive the driven shaft under variable speed conditions and rotation directions at will, brake mechanism for the secondary and intermediate shafts respectively; and pedal-operated control mechanism for concurrently engaging and disengaging the clutch members of the main and secondary shafts and for applying and releasing braking relations with the secondary and intermediate shafts by pedal activity at will.

2. A gear box as in claim 1 characterized in that the brake mechanism includes a brake drum on each of the secondary and intermediate shafts and spaced apart on a plane intersecting such shafts at right angles, a pair of individual brake bands for said drums also located on such plane, the free ends of said bands having an operative connection with the pedal operated control mechanism thereby to apply or release both bands concurrently by pedal activity of the control mechanism.

3. A gear box as in claim 2 characterized in that the pedal-operated control mechanism comprises a pivotally mounted member of lever type and having a lever extension beyond the pivot, a pivoted lever for and individual to the main and secondary shafts respectively with each operatively connected with its shaft under yieldable spring pressure to cause movement of the shaft and its clutch member from and toward the neighboring clutch members of the drive and driven shafts by oscillation of said levers, a connection between the main shaft lever and the main portion of the pedal lever, a connection between the secondary shaft lever and the extension of the pedal lever, and an arm projecting from the pedal lever extension and having a pivotal connection with the free end of both of the brake bands of the braking mechanism, the normal inactive position of the pedal lever presenting the respective clutch members in operative engagement and with the braking mechanism inactive, movement of the pedal on its pivot being operative to concurrently shift the main and secondary shafts to break the clutch engagement of such shafts and the drive and driven shafts respectively and to apply the brakes to the secondary and intermediate shafts with the former status restored by a reversal of such movements by return of the pedal to its normal position.

4. A gear box as in claim 1 characterized in that the gear of the main shaft and one of the movable gears of the secondary shaft have complemental tooth formations for establishing a direct-drive relation between said gears at will by shift lever activity upon the movable gear of the secondary shaft to thereby provide a direct drive between the drive and driven shafts for high speed rotation of the driven shaft, the intermediate shaft during such relation period rotating with the several shafts and being rendered inactive as a member of the drive path assembly by such gear assembly between the main and secondary shafts.

VICENTE ALBERTO PEDRO SARACCHI.

References Cited in the file of this patent
UNITED STATES PATENTS

| Number | Name | Date |
|---|---|---|
| 1,330,506 | Wilkins et al. | Feb. 10, 1920 |
| 1,403,819 | Stowers et al. | Jan. 17, 1922 |
| 1,541,240 | Barkeij | June 9, 1925 |